United States Patent [19]

Buma

[11] Patent Number: 4,660,810
[45] Date of Patent: Apr. 28, 1987

[54] CHANGE-OVER VALVE FOR AIR SUSPENSION

[75] Inventor: Shuuichi Buma, Toyota, Japan

[73] Assignee: Toyota Jidosha Kabushiki Kaisha, Toyota, Japan

[21] Appl. No.: 751,268

[22] Filed: Jul. 2, 1985

[30] Foreign Application Priority Data

Oct. 15, 1984 [JP] Japan .................................. 59-214300

[51] Int. Cl.⁴ .............................................. F16F 9/34
[52] U.S. Cl. .................................. 267/64.25; 188/299; 280/714
[58] Field of Search .................. 188/285, 299; 267/34, 267/35, 64.11, 64.15, 64.18, 64.22, 64.24, 64.25, 64.27, 64.28, 121; 280/668, 707, 712, 714, 715

[56] References Cited

U.S. PATENT DOCUMENTS 4,364,582 12/1982 Takahashi et al. ............. 188/299 X
4,534,580 8/1985 Kobayashi et al. .......... 267/64.25 X Primary Examiner—Duane A. Reger
Attorney, Agent, or Firm—Oblon, Fisher, Spivak, McClelland & Maier

[57] ABSTRACT

A change-over valve is interposed between a main air chamber formed to surround a shock absorber provided with a piston rod and an auxiliary air chamber, and includes a valve base having a first hole through which the piston rod extends, a second hole into which a valve body is inserted and a first part which affords communication between the second hole and the main and auxiliary air chambers, the valve body having a second path capable of communicating to the first path and disposed in the second hole, a holder provided on an outer periphery with a seal member and disposed in the second hole and a nut screwed onto the piston rod extending through the first hole to connect the piston rod with the valve base while preventing the holder from falling out.

8 Claims, 4 Drawing Figures

CHANGE-OVER VALVE FOR AIR SUSPENSION

BACKGROUND OF THE INVENTION

1. Field of the Invention

This invention relates to a change-over valve for an air suspension and, more particularly, to a changeover valve for an air suspension system provided with a main air chamber and an auxiliary air chamber used for a vehicle.

2. Description of the Prior Art

Some air suspensions systems are provided with a main air chamber formed of a housing and a diaphragm surrounding a shock absorber and an auxiliary air chamber formed of the housing or the like, both chambers being filled with compressed air to provide an air spring. In these air suspension systems, communication between the main and auxiliary air chambers can be afforded and interrupted by a change-over valve.

When both air chambers communicate with each other, such are subjected to the spring action of the air spring to enlarge the volume of the air chamber. As a result, the soft spring constant of the air spring is presented to provide an improved ride. Also, when communication between both air chambers is interrupted, only the main air chamber is subjected to the spring action of the air spring to reduce the volume of the air chamber. As a result, the air spring provides a hard spring constant to improve controllability.

Two types of change-over valves for affording and interrupting communication between the main and auxiliary air chambers are provided, one being a valve body rotatable about the axis and the other being as axially movable valve body. Either of these types are constituted ksuch that the valve body is disposed in a valve base and the valve body is prevented from falling out of the valve base by a member forced into the base. Such prevention of the valve body falling out by the forced member is an attempt to facilitate working of the valve base and the incorporation of the valve body since the diameter of the valve body is relatively small.

SUMMARY OF THE INVENTION

Since the member is forced into the valve base, it has been found to be impossible to interchange the valve body and O-rings and other seal members for holding the valve body in an air tight manner. Thus, when problems such as air leakage occur in the valve body inserting portion of the valve base, the entire shock absorber incorporating the housing and other structural elements have to be uneconomically replaced.

An object of the present invention is to provide a change-over valve for an air suspension system in which only a valve body or seal member can be replaced and the working and construction thereof are not complicated.

Another object of the present invention is to provide a change-over valve for an air suspension system in which a valve body can be prevented from unseated even if compressed air remains in an air chamber during the replacement.

According to the present invention is provided a change-over valve interposed between a main air chamber formed to surround a shock absorber provided with a piston rod and an auxiliary air chamber. The change-over valve comprises a valve base having a first hole through which said piston rod extends and a second hole into which a valve body being is inserted, the valve body disposed in said second hole, a holder disposed in said second hole and means removably fixed to the piston rod extending through said first hole to connect the piston rod with said valve base while preventing said holder from falling out.

According to the present invention, since the valve body is held by the holder which is prevented from falling out by means removably fixed to the piston rod, the holder, valve body, and seal members or the like can be taken out of the valve base and replaced when the valve body or seal members for making the valve body air-tight are worn or broken so as to cause an air leak. Thus, the economy of this change-over valve can be substantially improved. Furthermore, since the holder is fixed by the means itself for connecting the piston rod to the valve base, the construction thereof is simplified and the number of parts required is reduced.

In a preferred embodiment, one of the seal members is mounted on an outer peripheral surface of the holder and said means for connecting the piston rod to the valve base is a nut. The distance between the seal member mounted on the outer peripheral surface of the holder and an end face of the holder is smaller than a threaded-in length of the nut. Thus, the valve body can be prevented from being pushed out by the internal pressure to provide safety of operation even if the internal pressure exists in the air chamber during disassembly of the valve body.

The other objects and features of the present invention will become apparent from the following description of preferred embodiments of the invention with reference to the accompanying drawings.

DESCRIPTION OF THE PREFERRED EMBODIMENTS

Figure 1:
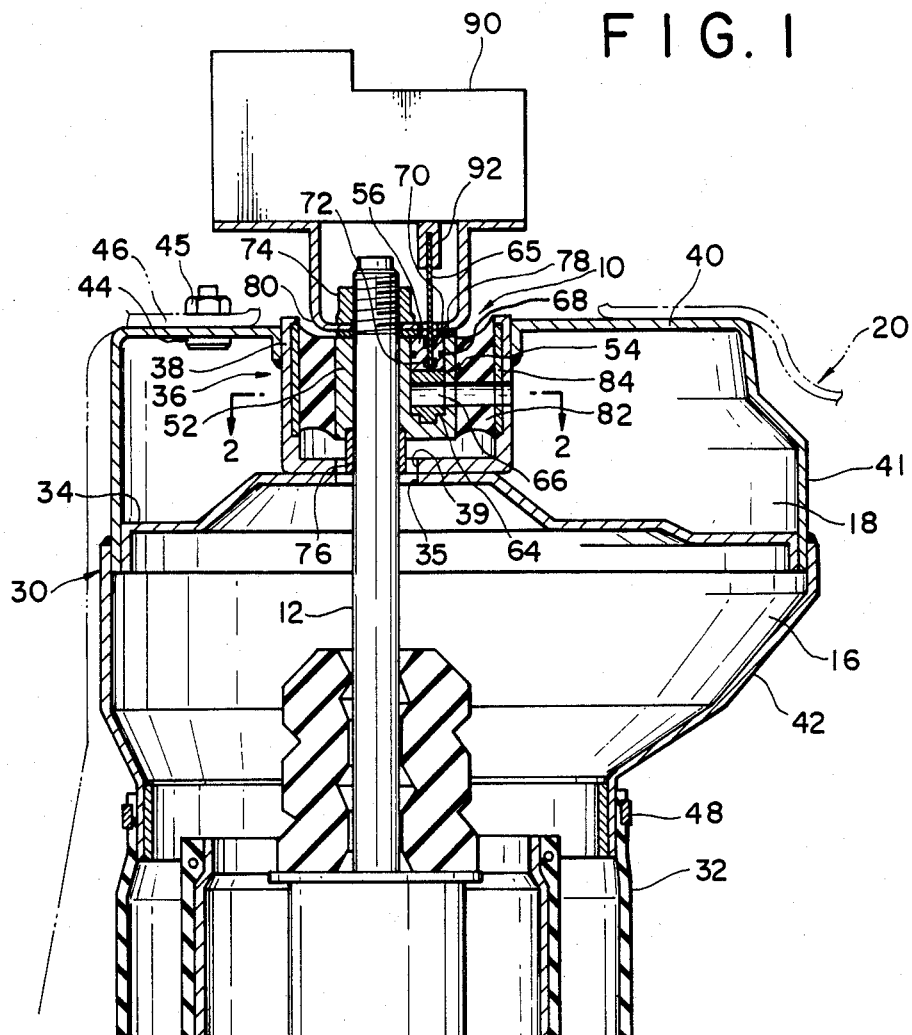
FIG. 1 is a sectional view showing a first embodiment of an air suspension system incorporating a change-over valve in accordance with the present invention.
Figure 3:
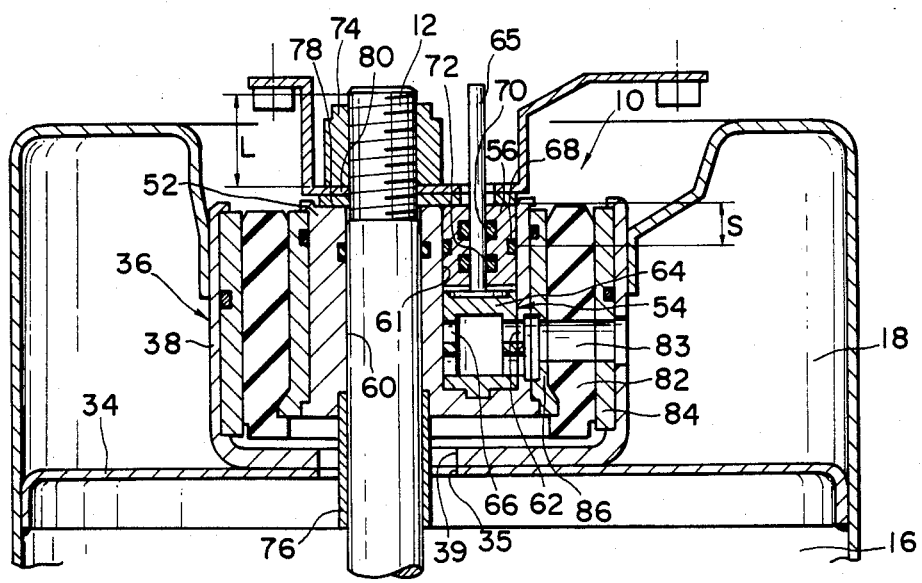
FIG. 3 is a sectional view showing the change-over valve of a second embodiment of the present invention.

As shown in FIGS. 1 and 3, a change-over valve 10 is interposed between a main air chamber 16 formed to surround a shock absorber 14 having a piston rod 12 and an auxiliary air chamber 18. The main and auxiliary air chambers 16, 18 are filled with compressed air to provide an air spring which constitutes an air suspension system 20 together with the shock absorber 14.

The shock absorber 14 which is provided with a cylinder 26, a piston (not shown) disposed in the cylinder 26 and the piston rod 12 connected to the piston and projecting from the cylinder 26 to the outside is well known per se. For shock absorber 14 is used a so-called mono-tube type one including a single cylinder in addition to a so-called twin tube type one including an inside and outside cylinders.

In the embodiment shown in the drawing, the main air chamber 16 is formed of a housing 30 and a diaphragm 32 in cooperation with each other, and on the other hand the auxiliary air chamber 18 is formed of the housing 30 and a partition plate 34 in cooperation with each other.

The housing 30 comprises a ceiling portion 40 having an annular flat portion and welded to a support member 38 over the whole inner peripheral edge, a first tubular portion 41 connected integrally with and extending downward from the ceiling portion and a second tubular portion 42. A plurality of bolts 44 (only one bolt is shown in the drawing) welded to the ceiling portion 40 of the housing 30 in an air tight manner extend through a car body 46. Nuts 45 are threaded respectively onto the bolts 44 to combine the housing 30 with the car body 46. To the first tubular portion 41 of the housing 30 is welded an outer peripheral edge of the generally annular partition plate 34, and an inner peripheral edge of the partition plate 34 is welded to the support member 38 while being spaced from the piston rod 12. The second tubular portion 42 of the housing 30 is fitted in the first tubular portion 41 and welded to the whole periphery thereof.

The diaphragm 32 formed of a cylindrical rubber member is folded back at the central portion, and an outside end thereof is sandwiched between the second tubular portion 42 of the housing 30 and a ring 48 which is caulked to fix the outside end to the housing 30. An inside end of the diaphragm 32 is fitted on a cylindrical air piston 50 welded to the cylinder 26.

The change-over valve 10 comprises a valve base 52, a valve body 54 and a holder 56.

The valve base 52 is formed of a rigid member such as iron having a circular section and provided with a hole 60 through which the piston rod 12 extends, a hole 61 into which the valve body 54 is inserted and a path 62 through which the hole 61 communicates to the main air chamber 16 and the auxiliary air chamber 18.

Figure 2:
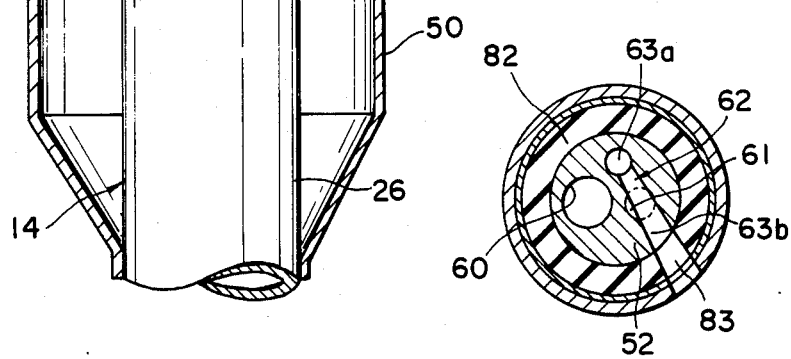
FIG. 2 is a sectional view taken along the line 2—2 in FIG. 1 omitting the valve body and piston rod.

In the embodiment shown in the drawing, the hole 60 extends through the valve base 52 from a lower surface to an upper one and the hole 61 extends from the upper surface to the neighborhood of the lower one. And as shown in FIG. 2, the path 62 consists of a path portion 63a extending from the lower surface of the intermediate portion and a path portion 63b extending from the path portion 63a to an outer peripheral surface across the hole 61. The path portion 63a communicates with the main air chamber 16 through a hole 39 in the support member 38 and a hole 35 in the partition member 34. On the other hand, the path portion 63b communicates to the auxiliary air chamber 18 through a path or the like in a bushing which will be described later. As a result, the hole 61 in the valve base 52 will communicate with the main and auxiliary air chambers 16, 18 through the path 62.

The valve body 54 is disposed within the hole 61 in the valve base 52. In the embodiment shown in the drawing, the valve body 54 consists of a slide portion 64 disposed rotatably in the hole 61 and a reduced diameter portion 65 connected integrally with the slide portion 64 and having the upper end formed flat. The slide portion 64 has a path 66 extending laterally and capable of communicating to the path portion 63b of the path 62 in the valve base 52. When the valve body 54 is in the position shown in the drawing, the path 66 communicates to the path portion 63b and when the valve body 54 is rotated from such position by 90° for example, the path 62 is shut off.

The holder 56 is disposed within the hole 61 in the valve base 52 to prevent the valve body 54 from falling out and hold the valve body in the air tight condition.

The holder 56 is formed cylindrically and inserted loosely into the hole 61. The reduced diameter portion 65 of the valve body 54 extends through the holder 56 and projects to the outside. An O-ring 68 for sealing purposes is disposed on an outer peripheral surface of the holder 56 and O-rings 70,72 on an inner peripheral surface respectively to hold gaps between the valve base 52 and the holder 56 and between the valve body 54 and the holder 56 in the air tight condition.

The distance S between the O-ring 68 mounted on the outer peripheral surface of the holder 56 and an upper end face of the holder is designed to be smaller than the threaded-in length L of a nut 74 screwed onto the piston rod 12. This constitution prevents the valve body 54 from being pushed out by the internal pressure in the main or auxiliary air chamber. This can otherwise be caused by the following reason. When the nut 74 is loosened, the valve body 54 is pushed out by the internal pressure. And when the O-ring 68 is disengaged from the valve base 52, the internal pressure is released to the atmosphere to lose the action of pushing out the valve body 54. At that time, the nut 74 is still threaded onto the piston rod 12 to engage the holder 56.

In the second embodiment shown in FIG. 3, a ring 76 fixed to the piston rod 12 abuts against a shoulder of the hole 60 in the valve base 52 and an end of the piston rod 12 projects from the valve base 52. A holding plate 78 and a bracket 80 for an actuator which will be described later are fitted and the nut 74 is threaded onto the end of the piston rod 12. The holding plate 78 and nut 74 make close contact respectively with the holder 56 and bracket 80.

The holding plate 78 is formed so as to have a requisite length to almost cover the upper end face of the holder 56. The nut 74 which is threaded onto the piston rod 12 connects the piston rod 12 to the valve base 52 while engaging the holder 56 through the holding plate 78 to fix the holder 56. Such interposition of the holding plate 78 is preferable since a uniform force acts on the holder 56. The same effect is obtained by the bracket 80, omitting the holding plate 78. Also, when the bracket 80 is not attached to the piston rod 12, the nut 74 having a larger outer diameter may be used to engage directly and fixedly the holder 56.

The support 36 comprises a rubber bushing 82 disposed outside the valve base 52 to prevent the car body 46 from vibration of the shock absorber 14 and said support member 38. In the embodiment shown in FIG. 1, the bushing 82 is bonded on an inner peripheral surface thereof to the valve base 52 and on an outer peripheral surface to a tube 84 which is forced into the support member 38 in an air tight manner. Also, in the embodiment shown in FIG. 3, the bushing 82 is bonded on the inner peripheral surface to a tube 86 and on the outer peripheral surface to the tube 84. The valve base 52 and the tube 84 are forced respectively into the tube 86 and the support member 38 in an air tight manner.

The bushing 82 has a path 83 communicating to the path portion 63b of the path 62 in the valve base 52 and other parts have respectively paths as shown in the drawing. The path 62 communicates to the auxiliary air chamber 18 through these paths.

An actuator 90 having a motor and a reduction gear is well known per se, and mounted on the piston rod 12 through the bracket 80. Into a slit formed in the output shaft 92 of the actuator 90 is inserted a flat portion provided on the upper end of the reduced diameter portion of the valve body 54.

Figure 4:
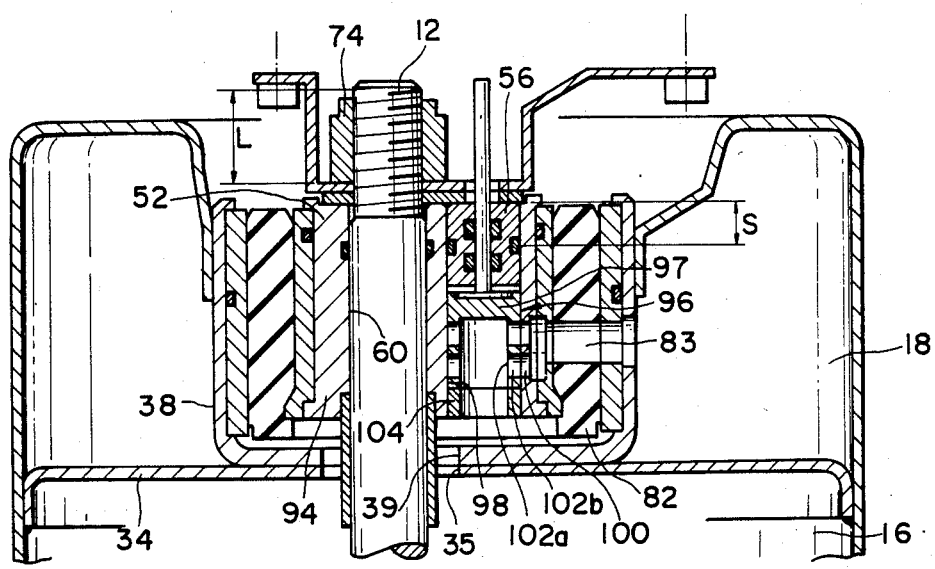
FIG. 4 is a sectional view showing a third embodiment of the change-over valve of the present invention.

In the embodiment shown in FIG. 4, the constitution of a valve base 94 and a valve body 96 are different from those of the previously mentioned embodiment. That is, the valve base 94 has hole 60 formed therein through which the piston rod 12 extends. A hole 98 in which the valve body 96 is disposed and a path 100. The hole 98 extends through the valve base 94 from a lower surface to an upper one and communicates to the main air chamber 16 through the hole 39 in the support member 38 and the hole 35 in the partition member 34. On the other hand, the path 100 is opened laterally from the hole 98 to communicate to the auxiliary air chamber 18 through the path 83 in the bushing 82 and respective paths in the parts.

The valve body 96 has formed in a slide portion 97 thereof a path portion 102a extending axially from a lower end face and a path portion 102b opened radially from said path portion and capable of communicating with the path 100 in the valve base 94.

A cylindrical holder 104 is force fitted into the hole 98 in the valve base 94, and the valve body 96 and the holder 56 are disposed in the hole 98. The nut 74 screwed onto the piston rod 12 engages fixedly the holder 56. The other constitutions in this embodiment are the same those shown in FIGS. 1 and 3.

The exact operation of the above-noted embodiments is as follows. When the spring constant of the air suspension system is to be increased, the actuator 90 is operated and the valve 54 is rotated so as to shut off or block communication between passage 66 and path 62. As a result, only the main air chamber 16 acts as an air spring. When the spring constant of the air suspension system is to be decreased, the actuator 90 is operated and the valve body 54 is rotated so as to afford communication between the passage 66 and the path 62. As a result, both main and auxiliary air chambers 16, 18 act as an air spring. When the holder 56 or valve body 54 are to be replaced, the nut 74 is released and removed from the piston rod 12, and further, the bracket 80 and the holding plate 78 are removed. Thus, the holder 56 and valve body 54 are ready to be taken out by pulling on the reduced diameter portion 65 of the valve body 54.

Obviously, numerous modifications and variations of the present invention are possible in light of the above teachings. It is therefore to be understood that within the scope of the appended claims, the invention may be practiced otherwise than as specifically described herein.

What is claimed is:

1. A change-over valve for an air suspension interposed between a main air chamber formed to surround a shock absorber provided with a piston rod and an auxiliary air chamber, comprising:

a valve base having a first hole through which said piston rod extends and a second hole into which a valve body is inserted;

the valve body disposed in said second hole;

a holder disposed in said second hole; and means removably fixed to the piston rod extending through said first hole to connect the piston rod with said valve base while preventing said holder from falling out.

2. A change-over valve for an air suspension as claim in claim 1, wherein said means comprises a nut screwed onto said piston rod.

3. A change-over valve for an air suspension as claimed in claim 2, wherein said holder has a seal member on an outer peripheral surface and the threaded-in length of said nut onto said piston rod is larger than the distance between said nut side end face of said holder and said seal member.

4. A change-over valve for an air suspension as claimed in claim 1, wherein a holding plate is interposed between said means and said holder.

5. A change-over valve for an air suspension interposed between a main air chamber formed to surround a shock absorber provided with a piston rod and an auxiliary air chamber, comprising:

a valve base having a first hole through which said piston rod extends, a second hole into which a valve body is inserted and a first path through which the second hole communicates to said main air chamber and auxiliary air chamber;

the valve body disposed in said second hole and having a second path capable of communicating to said first path;

a holder disposed in said second hole and mounting a seal member on an outer periphery thereof; and a nut screwed onto the piston rod extending through said first hole to connect the piston rod with said valve base while preventing said holder from falling out.

6. A change-over valve for an air suspension as claimed in claim 5, wherein said second hole extends from an upper surface to the intermediate portion of said valve base, said first path includes a path portion extending from a lower surface to the intermediate portion of said valve base and another path portion extending from said path portion to an outer peripheral surface across said second hole and said second path extends radially of said valve body.

7. A change-over valve for an air suspension as claim in claim 5, wherein said second hole extends from a lower surface to an upper surface of said valve base, said first path extends radially and said second path includes a path portion extending from a lower surface to the intermediate portion of said valve body and another path portion extending from said path portion to an outer peripheral surface.

8. A change-over valve for an air suspension as claim in claim 5, wherein the threaded-in length of said nut onto said piston rod is larger than the distance between said nut side end face of said holder and said seal member.

* * * * *